United States Patent
Peng et al.

(10) Patent No.: US 11,362,940 B2
(45) Date of Patent: Jun. 14, 2022

(54) METHOD AND APPARATUS FOR DETERMINING IDENTIFICATION INFORMATION ABOUT CROSS-DOMAIN PATH, AND STORAGE MEDIUM

(71) Applicant: XI'AN ZHONGXING NEW SOFTWARE CO., LTD., Shenzhen (CN)

(72) Inventors: Shaofu Peng, Shenzhen (CN); Feicai Jin, Shenzhen (CN); Shencai Zhu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 152 days.

(21) Appl. No.: 16/623,613

(22) PCT Filed: May 29, 2018

(86) PCT No.: PCT/CN2018/088880
§ 371 (c)(1),
(2) Date: Dec. 17, 2019

(87) PCT Pub. No.: WO2019/007166
PCT Pub. Date: Jan. 10, 2019

(65) Prior Publication Data
US 2020/0213223 A1    Jul. 2, 2020

(30) Foreign Application Priority Data
Jul. 3, 2017   (CN) .................... 201710532649.1

(51) Int. Cl.
*H04L 45/42* (2022.01)
*H04L 12/46* (2006.01)
(Continued)

(52) U.S. Cl.
CPC .......... *H04L 45/42* (2013.01); *H04L 12/4633* (2013.01); *H04L 41/12* (2013.01);
(Continued)

(58) Field of Classification Search
CPC ....... H04L 45/42; H04L 45/02; H04L 45/507; H04L 45/26; H04L 45/04; H04L 45/24;
(Continued)

(56) References Cited

U.S. PATENT DOCUMENTS

2009/0245253 A1* 10/2009 Chen ................. H04L 45/42
370/390
2010/0208733 A1    8/2010 Zhao
(Continued)

FOREIGN PATENT DOCUMENTS

CN    101908998 A    12/2010
CN    101931583 A    12/2010
(Continued)

OTHER PUBLICATIONS

International Search Report for corresponding application PCT/CN2018/088880 filed May 29, 2018' dated Aug. 20, 2018.
(Continued)

*Primary Examiner* — Joshua Kading
(74) *Attorney, Agent, or Firm* — Cantor Colburn LLP

(57) ABSTRACT

Provided are a method and apparatus for determining identification information about a cross-domain path, and a storage medium. The method includes: receiving a path computation request from a first child path computation element (PCE), wherein the path computation request carries a compression identifier for identifying compression of path segments and a path set-up type (PST); after identification information about a path from a source node to a destination node is acquired, instructing, according to the compression identifier and the PST, each of sub-PCEs
(Continued)

corresponding to the one or more path segments to compress identification information about a respective one of the one or more path segments; and receiving the compressed identification information about each path segment.

20 Claims, 4 Drawing Sheets

(51) Int. Cl.
| | |
|---|---|
| H04L 47/70 | (2022.01) |
| H04L 45/50 | (2022.01) |
| H04L 45/02 | (2022.01) |
| H04L 41/12 | (2022.01) |
| H04L 45/00 | (2022.01) |
| H04L 45/24 | (2022.01) |
| H04L 47/72 | (2022.01) |

(52) U.S. Cl.
CPC .............. *H04L 45/02* (2013.01); *H04L 45/04* (2013.01); *H04L 45/24* (2013.01); *H04L 45/26* (2013.01); *H04L 45/507* (2013.01); *H04L 47/72* (2013.01); *H04L 47/825* (2013.01)

(58) Field of Classification Search
CPC ..... H04L 45/50; H04L 41/12; H04L 12/4633; H04L 47/72; H04L 47/825; H04L 47/821
See application file for complete search history.

(56) References Cited

U.S. PATENT DOCUMENTS

| | | | |
|---|---|---|---|
| 2012/0213224 A1* | 8/2012 | Chen | H04L 45/44 370/390 |
| 2012/0246625 A1 | 9/2012 | Puthuff | |
| 2012/0308225 A1* | 12/2012 | Long | H04J 14/0267 398/13 |
| 2014/0369356 A1 | 12/2014 | Bryant | |
| 2015/0163125 A1* | 6/2015 | Caviglia | H04L 45/26 370/254 |
| 2016/0105358 A1 | 4/2016 | Kannan | |
| 2016/0105958 A1 | 4/2016 | Kannan | |
| 2016/0359735 A1* | 12/2016 | Zhao | H04L 45/028 |
| 2017/0163443 A1* | 6/2017 | Chen | H04L 45/124 |
| 2019/0349286 A1* | 11/2019 | Bruno | H04L 45/04 |

FOREIGN PATENT DOCUMENTS

| | | |
|---|---|---|
| CN | 102742224 A | 10/2012 |
| CN | 102970222 B | 8/2015 |
| WO | 2011057154 A1 | 5/2011 |

OTHER PUBLICATIONS

European Search Report for corresponding application EP18 82 7949: Report dated Feb. 16, 2021.
Chinese Office Action for corresponding application 201710532649. 1; Report dated Aug. 18, 2021.
Chinese Search Report for corresponding application 201710532649. 1; Report dated Aug. 13, 2021.

* cited by examiner

METHOD AND APPARATUS FOR DETERMINING IDENTIFICATION INFORMATION ABOUT CROSS-DOMAIN PATH, AND STORAGE MEDIUM

CROSS-REFERENCES TO RELATED APPLICATIONS

This is a National Stage Application, filed under 35 U.S.C. 371, of International Patent Application No. PCT/CN2018/088880, filed on May 29, 2018, which claims priority to Chinese patent application No. 201710532649.1 filed on Jul. 3, 2017, contents of both of which are incorporated herein by reference in their entireties.

TECHNICAL FIELD

The present application relates to the field of communications and specifically, relates to a method and apparatus for determining identification information about a cross-domain path, and a storage medium.

BACKGROUND

In the RFC 5623, the computing cross-domain Traffic Engineering (TE) paths by adopting a hierarchical Path Computation Element (PCE) architecture has been discussed. A parent PCE is able to acquire connections between all domains from each sub-PCE and maintain a domain-level topology. When the parent PCE is requested by a certain sub-PCE to compute the cross-domain TE path, the parent PCE firstly obtains according to the domain-level topology, which domain sequences may be passed through by the TE path, and then for each domain sequence, requests each sub-PCE to compute a path segment in a corresponding domain. After the parent PCE receives the computation result of the each sub-PCE, all the path segments are spliced to obtain a complete cross-domain TE path. The parent PCE selects one optimal path from the complete TE paths corresponding to these domain sequences, and replies to the sub-PCE requesting the computation path, which replies to the corresponding Path Computation Client (PCC) with the computation path.

The draft-ietf-pce-segment-routing-09 discusses how the PCE uses a segment list to represent the computed TE path for applying to a scenario of segment route forwarding. In general, in the segment routing scenario, a strict explicit next hop within a domain in the TE path may be represented by using an adjacency segment-identification (SID) of a segment routing, while a strict explicit next hop between domains in the TE path may be represented by using a Peer-Adj SID of the segment routing. As described above, when the parent PCE is requested by a certain sub-PCE to compute a cross-domain TE path, the sub-PCE may specify a Path Setup Type (PST) as "path setup using a segment routing technique". When the parent PCE requests the sub-PCE to compute the path in the domain for each domain sequence, the parent PCE also specifies that the PST as "path setup using the segment routing technique". Then, path segment information with which the each sub-PCE replies to the parent PCE may be represented by an adjacency SID list, and the parent PCE may also use an adjacency SID+Peer-Adj SID list to represent a complete TE path when the parent PCE finally replies, with an optimal path, to the sub-PCE that requests the parent PCE to compute the path. However, a major problem here is that the complete TE path is generally long, a deep label stack corresponding to the adjacency SID+Peer-Adj SID list is resulted in, label encapsulation capability of a device is easily exceeded, and forwarding efficiency and maximum transmission unit (MTU) problems are introduced. Another problem is that the each sub-PCE may not necessarily return the information about the path segment in the domain to the parent PCE according to a local strategy. For example, a concept and a mechanism of a path-key are defined by RFC 5520, the sub-PCE may reply to the parent PCE with the path-key replacing the path segment information in an explicit routing, and then a head node PCC of a final TE path cannot obtain a complete adjacency SID+Peer-Adj SID list.

In order to shorten the segment routing SID list corresponding to the complete TE path, a binding segment is defined in draft-ietf-spring-segment-routing-11, and may be used for referring to forwarding information about one tunnel. That is, if one tunnel is additionally created for a certain path segment in the complete TE path, and then the path segment may be represented by using one corresponding binding segment-identification (Binding SID). Based on the idea, many protocols have been extended accordingly, and examples are descried below.

1) An Intermediate system to intermediate system (ISIS) is extended and a SID/Label Binding TLV (where T represents Tag, L represents Length and V represents Value) and the usage method thereof are defined in draft-ietf-isis-segment-routing-extensions-12. However, only a Binding SID/Label for a SR-TE path (that is, the TE path established by using the segment routing technique) is defined and a Binding SID/Label corresponding to the Resource Reservation Protocol-Traffic Engineering (RSVP-TE) path (that is, the TE path established by using the RSVP-TE signaling) is not defined (note: when the RSVP-TE path is served as a Forwarding-adjacency, and an Interior Gateway Protocol (IGP) adjacency SID but not the Binding SID may be allocated). In addition, the method is only applicable in the IGP area, and not applicable in the cross-domain TE path.

2) A Border Gateway Protocol-Link State (BGP-LS) (see RFC7752) is extended and a notification method of the Binding SID TLV is defined in the draft-ietf-idr-bgp-ls-segment-routing-ext-01. Since the BGP-LS generally imports link state data from IGP instances, the method is similar to the above-mentioned ISIS-SR, and only defines the Binding SID/Label for the SR-TE path, and does not define the Binding SID/Label corresponding to the RSVP-TE path. In addition, Explicit Route Object (ERO) information corresponding to the path segment is to be provided with the Binding SID in the method, while as mentioned above, the sub-PCE does not necessarily expose the path segment information in its domain to the parent PCE, so in the hierarchical PCE architecture, the method is only applicable to the PCC reporting a Binding SID to the sub-PCE at most, but not to the sub-PCE reporting the Binding SID to the parent PCE. In addition, the method is generally only used for synchronizing data in the direction from the PCC to the PCE, and not for the tunnel initiatively created by the PCE. Finally, the method only describes how the BGP-LS carries the Binding SID as a channel, and does not focus on providing solutions for the cross-domain TE path computation and packet forwarding.

3) A Path Computation Element Protocol (PCEP) (see RFC 5440) is extended and a method for notifying a tunnel segment is defined in the draft-li-pce-tunnel-segment-02. The tunnel segment is similar to the above-mentioned Binding SID, and the RSVP-TE tunnel and the SR-TE tunnel are supported. The method relates to a plurality of channels, a PCE-LS similar to the BGP-LS (seen draft-dhodylee-pcepcep-ls-07) is used to perform notification in a direction from the PCC to the PCE, and a PCLabelUpd (see draft-zhao-pce-pce-pcep-extension-for-pce-controller-04) similar to a NETCONF is used in a direction from the PCE to the PCC. Both the PCE-LS and the PCLabelUpd are nominally extension protocols of the PCEP, but differ greatly, and are complex when implemented and deployed. Similarly, the method only describes how the PCEP notifies the tunnel segment as a channel, and does not focus on providing solutions for the cross-domain TE path computation and packet forwarding.

4) The PCEP is also extended in the draft-sivabalan-pce-binding-label-sid-02 so as to notify the Binding label to the RSVP-TE path, and notify the Binding SID to the SR-TE path, and the binding label/SID is reported by the PCC to the PCE. The method is only used for synchronizing data in the direction from the PCC to the PCE, and not for the tunnel initiatively created by the PCE. Similarly, the method only describes how the PCEP notifies the binding label/SID as a channel, and does not focus on providing solutions for the cross-domain TE path computation and packet forwarding.

In view of the problem that the path identification information is too long in the related art, no effective solution has yet been proposed.

SUMMARY

Embodiments of the present application provide a method and apparatus for determining identification information about a cross-domain path, and a storage medium, to solve at least the problem of excessive length of the path identification information in the related art.

According to one embodiment of the present application, a method for determining identification information about a cross-domain path is provided. The method includes steps described below. A path computation request from a first child path computation element (PCE) is received, where the path computation request is used for making a request to acquire a path from a source node to a destination node, the source node and the destination node are located in different domains, the path includes one or more path segments, and the path computation request carries a compression identifier for identifying compression of the one or more path segments and a path setup type (PST). After identification information about the path from the source node to the destination node is acquired, each of sub-PCEs corresponding to the one or more path segments is instructed according to the compression identifier and the PST to compress identification information about the respective each corresponding path segment. The compressed identification information about the one or more path segments returned by the each of sub-PCEs corresponding to the one or more path segments is received, and, the compressed identification information about the one or more path segments is combined into the compressed identification information about the path according to the identification information about the path.

Optionally, the step in which the each of sub-PCEs corresponding to the one or more path segments is instructed according to the compression identifier to compress the identification information about a respective one of the one or more path segments includes steps described below. According to the compression identifier, a creation message is sent to the each of sub-PCEs corresponding to the one or more path segments, where the creation message is used for requesting the each of sub-PCEs corresponding to the one or more path segments to create a tunnel, and assign a binding segment-identification (Binding SID) to the created tunnel, where the creation message carries path information about the one or more path segments.

Optionally, the creation message being used for requesting the each of sub-PCEs corresponding to the one or more path segments to create the tunnel includes one of the following: the creation message is used for requesting the each of sub-PCEs corresponding to the one or more path segments to create a Resource Reservation Protocol-Traffic Extension (RSVP-TE) tunnel; the creation message is used for requesting the each of sub-PCEs corresponding to the one or more path segments to create a Segment Routing-Traffic Engineering (SR-TE) tunnel; or the creation message is used for requesting the each of sub-PCEs corresponding to the one or more path segments to create the RSVP-TE tunnel or the SR-TE tunnel.

Optionally, the step in which the compressed identification information about the one or more path segments returned by the each of sub-PCEs corresponding to the one or more path segments is received, and in which the compressed identification information about the one or more path segments is combined into the compressed identification information about the path includes steps described below. The Binding SID assigned to the created tunnel and returned by the each of sub-PCEs corresponding to the one or more path segments is received; and received Binding SIDs returned by the sub-PCEs corresponding to the one or more path segments are combined into compressed identification information about the path.

Optionally, the path information includes: a path name of the path, segment information about the one or more path segments, starting node information and destination node information about to be created tunnel, and the PST.

Optionally, after the compressed identification information about the one or more path segments are combined into the compressed identification information about the path according to the identification information about the path, the method includes that: the compressed identification information about the path is returned to the first sub-PCE.

According to another embodiment of the present application, a method for determining identification information about a cross-domain path is further provided. The method includes steps described below. A path computation request is sent to a parent path computation element (PCE), where the path computation request is used for making a request to acquire a path from a source node to a destination node, the source node and the destination node are located in different domains, the path includes one or more path segments, and the path computation request carries a compression identifier for identifying compression of the one or more path segments and a path setup type (PST). A creation message from the parent PCE is received, where the creation message is sent by the parent PCE according to the compression identifier and the PST. The identification information about a path segment is compressed according to the creation message. The compressed identification information about the one or more path segments is returned to the parent PCE.

Optionally, the step in which the identification information about the one or more path segments is compressed according to the creation message includes steps described below. Path information about the one or more path segments carried in the creation message is determined. A tunnel is created according to the path information, and a binding segment-identification (Binding SID) is assigned to the created tunnel.

Optionally, the creation message is used for making a request to create at least one of following tunnels: a Resource Reservation Protocol-Traffic Engineering (RSVP-TE) tunnel; or a Segment Routing-Traffic Engineering (ST-TE) tunnel.

Optionally, the step in which the tunnel is created according to the path information includes that: the tunnel is instantiated according to the path information, and that the creation message is forwarded to a path computation client (PCC) as a starting node of the tunnel to be created, where the creation message is used for instructing the PCC to initiate, according to the path information, a process of creating the tunnel.

Optionally, the method includes one of the following: when the creation message is used for making a request to create the RSVP-TE tunnel, the creation message is used for instructing the PCC to initiate an RSVP-TE signaling setup path; or when the creation message is used for making a request to create the SR-TE tunnel, the creation message is used for instructing the PCC to compute forwarding information about the path according to segment routing information.

Optionally, the step in which the Binding SID is assigned to the created tunnel includes: in condition that the segment-identification (SID) is assigned by a controller globally and uniformly, after the tunnel is instantiated according to the path information, the Binding SID is assigned to the tunnel and reported to the parent PCE and the PCC; and/or that in condition that the SID is assigned by a forwarding device and where the assigned SID is reported to the controller, the Binding SID assigned by the PCC to the tunnel after the PCC creates the tunnel is received and the Binding SID is reported to the parent PCE.

Optionally, after the compressed identification information about the one or more path segments is returned to the parent PCE, the method further includes steps described below. Compressed identification information about the path from the parent PCE is received. In condition that the path computation request is initiated by a predetermined path computation client (PCC), the compressed identification information about the path is returned to the predetermined PCC. In condition that the path computation request is not initiated by the predetermined path computation client (PCC), the compressed identification information about the path is sent to a PCC as a starting node of the tunnel.

According to another embodiment of the present application, an apparatus for determining identification information about a cross-domain path is further provided. The apparatus includes: a first receiving module, an instruction module and a second receiving module. The first receiving module is configured to receive a path computation request from a first child path computation element (PCE), where the path computation request is used for making a request to acquire a path from a source node to a destination node, the source node and the destination node are located in different domains, the path includes one or more path segments, and the path computation request carries a compression identifier for identifying compression of the one or more path segments and a path setup type (PST). The instruction module is configured to instruct, according to the compression identifier and the PST, each of sub-PCEs corresponding to the one or more path segments to compress the identification information about a respective one of the one or more path segments after identification information about the path from the source node to the destination node is acquired. The second receiving module is configured to receive the compressed identification information about the one or more path segments returned by the each of sub-PCEs corresponding to the one or more path segments, and combine, according to the identification information about the path, the compressed identification information about the one or more path segments into the compressed identification information about the path.

Optionally, the instruction module includes a sending element. The sending element is configured to send a creation message to the each of sub-PCEs corresponding to the one or more path segments according to the compression identifier, where the creation message is used for requesting the each of sub-PCEs corresponding to the one or more path segments to create a tunnel, and assign a binding segment-identification (Binding SID) to the created tunnel, where the creation message carries path information about the one or more path segments.

According to another embodiment of the present application, an apparatus for determining identification information about a cross-domain path is further provided. The apparatus includes: a sending module, a third receiving module, a compression module and a first returning module. The sending module is configured to send a path computation request to a parent path computation element (PCE), where the path computation request is used for making a request to acquire a path from a source node to a destination node, the source node and the destination node are located in different domains, the path includes one or more path segments, and the path computation request carries a compression identifier for identifying compression of the one or more path segments and a path setup type (PST). The third receiving module is configured to receive a creation message from the parent PCE, where the creation message is sent by the parent PCE according to the compression identifier and the PST. The compression module is configured to compress identification information about a path segment according to the creation message. The first returning module is configured to return the compressed identification information about the one or more path segments to the parent PCE.

Optionally, the compression module includes: a determination element and a creation element. The determination element is configured to determine path information about the one or more path segments carried in the creation message. The creation element is configured to create a tunnel according to the path information, and assign a binding segment-identification (Binding SID) to the created tunnel.

Optionally, the apparatus further includes: a fourth receiving module, a second returning module and a third returning module. The fourth receiving module is configured to receive compressed identification information about the path from the parent PCE after the compressed identification information about the one or more path segments is returned to the parent PCE. The second returning module is configured to return the compressed identification information about the path to a predetermined path computation client (PCC) in condition that the path computation request is initiated by the predetermined PCC. The third returning module is configured to send the compressed identification information about the path to a path computation client (PCC) as a starting node of the tunnel in condition that the path computation request is not initiated by the predetermined PCC.

According to another embodiment of the present application, a storage medium is further provided. The storage medium includes stored programs which, when run, execute the method of any one of the embodiments described above.

According to another embodiment of the present application, a processor is further provided. The processor is configured to run programs which, when run, execute the method of any one of the embodiments described above.

According to the present application, after identification information about the path from the source node to the destination node is acquired, the identification information about the path is compressed, and thereby the length of the identification information about the path is effectively reduced, and the problem of excessive length of the path identification information in the related art is solved.

BRIEF DESCRIPTION OF DRAWINGS

The drawings described herein are used to provide a further understanding of the present application and form a part of the present application. The exemplary embodiments and description thereof in the present application are used to explain the present application and not to limit the present application in any improper way. In the drawings.

DETAILED DESCRIPTION

The present application will be described hereinafter in detail through embodiments with reference to the drawings. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

Embodiment One

Figure 1:
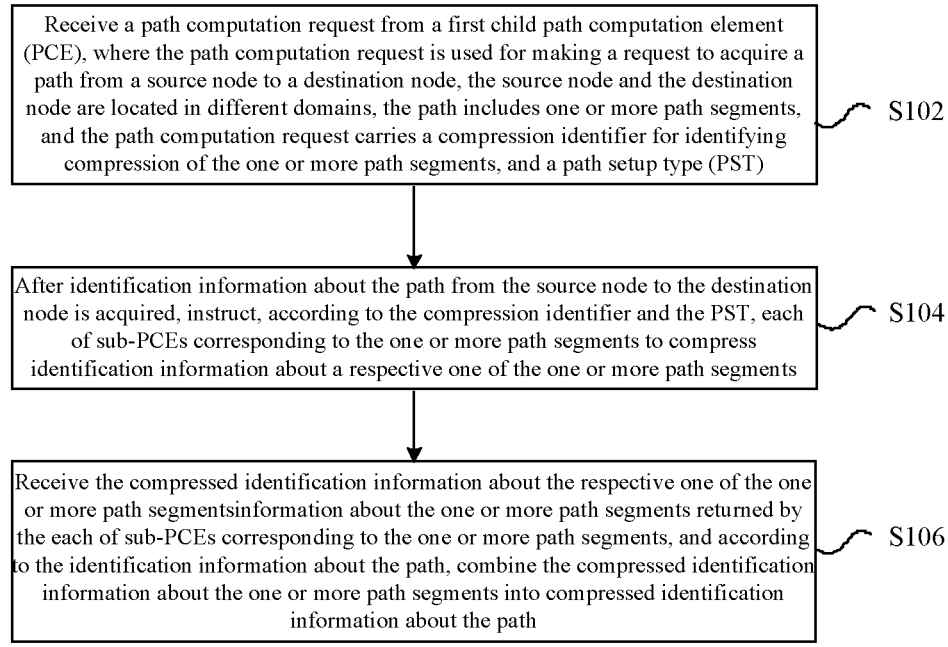
FIG. 1 is a flowchart of a first method for determining identification information about a cross-domain path according to an embodiment of the present application.

FIG. 1 is a flowchart of a first method for determining identification information about a cross-domain path according to an embodiment of the present application. As shown in FIG. 1, a process includes the steps described below.

In step S102, a path computation request from a first child path computation element (PCE) is received, where the path computation request is used for making a request to acquire a path from a source node to a destination node, the source node and the destination node are located in different domains, the path includes one or more path segments, and the path computation request carries a compression identifier for identifying compression of the path segments and a path setup type (PST).

In step S104, after identification information about the path from the source node to the destination node is acquired, each of sub-PCEs corresponding to the one or more path segments is instructed according to the compression identifier and the PST to compress identification information about a respective one of the one or more path segments.

In step 106, the compressed identification information about the one or more path segments returned by the each of sub-PCEs corresponding to the one or more path segments is received, and the compressed identification information about the one or more path segments is combined into the compressed identification information about the path according to the identification information about the path.

The above operations may be performed by a parent PCE. The processing on the parent PCE side is described in the embodiment one.

According to the above steps, after identification information about the path from the source node to the destination node is acquired, the identification information about the path is compressed, and thereby the length of the identification information about the path is effectively reduced, and the problem of excessive length of the path identification information in the related art is solved.

In an optional embodiment, the step in which the each of sub-PCEs corresponding to the one or more path segments is instructed according to the compression identifier to compress the identification information about the corresponding path segment includes: a creation message is sent to the each of sub-PCEs corresponding to the one or more path segments according to the compression identifier. The creation message is used for requesting the each of sub-PCEs corresponding to the one or more path segments to create a tunnel, and a binding segment-identification (Binding SID) is assigned to the created tunnel. The creation message carries path information about the one or more path segments.

In an optional embodiment, the above-mentioned creation message being used for requesting the each of sub-PCEs corresponding to the one or more path segments to create the tunnel includes one of the following: the above-mentioned creation message is used for requesting the each of sub-PCEs corresponding to the one or more path segments to create a Resource Reservation Protocol-Traffic Engineering (RSVP-TE) tunnel; the above-mentioned creation message is used for requesting the each of sub-PCEs corresponding to the one or more path segments to create a Segment Routing-Traffic Engineering (SR-TE) tunnel; or the above-mentioned creation message is used for requesting the each of sub-PCEs corresponding to the one or more path segments to create the RSVP-TE tunnel or the SR-TE tunnel.

In an optional embodiment, the step in which the compressed identification information about the one or more path segments returned by the each of sub-PCEs corresponding to the one or more path segments is received, and in which the compressed identification information about the one or more path segments is combined into the compressed identification information about the path includes: the Binding SID assigned to the created tunnel and returned by the each of sub-PCEs corresponding to the one or more path segments is received; and that the received Binding SIDs returned by the sub-PCEs corresponding to the one or more path segments are combined into the compressed identification information about the path.

In an optional embodiment, the above-mentioned path information includes: a path name of the path, segment information about the one or more path segments, starting node information and destination node information about the tunnel to be created, and the above-mentioned PST.

In an optional embodiment, after the compressed identification information about the one or more path segments are combined into the compressed identification information about the path according to the above-mentioned identification information about the path, the method further includes: the compressed identification information about the path is returned to the first sub-PCE. In other words, in response to the path computation request sent by the first sub-PCE, the compressed identification information about the path is returned to the first sub-PCE, and the first sub-PCE may continue to perform subsequent operations after acquiring the compressed identification information about the path. For example, the first sub-PCE may send the acquired compressed identification information about the path to the corresponding PCC, and the PCC encapsulates a packet according to the identification information about the path, and forwards the packet.

Embodiment Two

Figure 2:
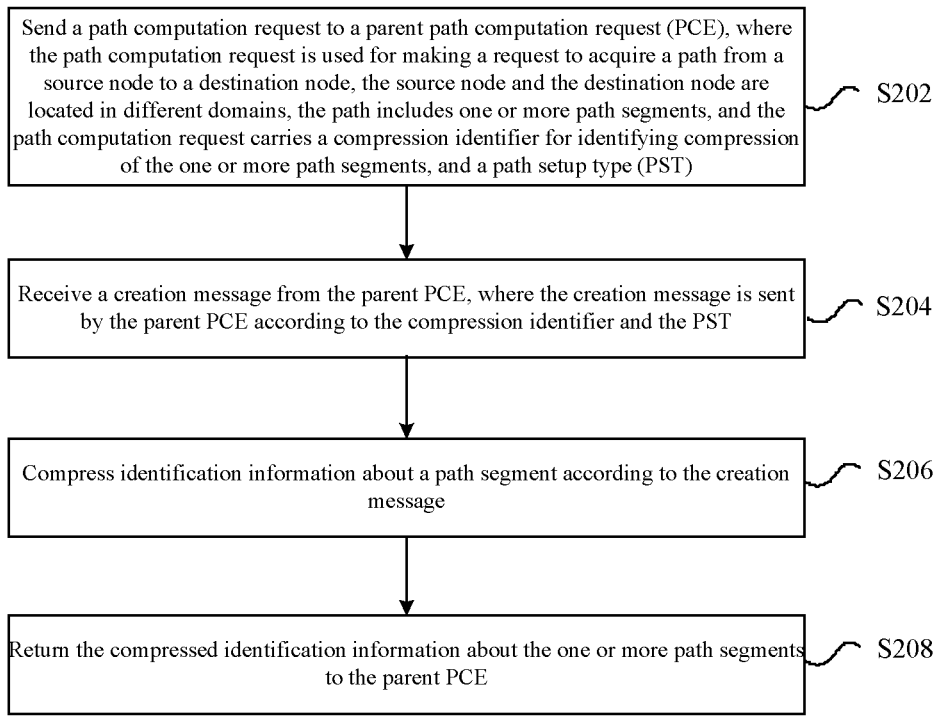
FIG. 2 is a flowchart of a second method for determining identification information about a cross-domain path according to an embodiment of the present application.

FIG. 2 is a flowchart of a second method for determining identification information about a cross-domain path according to an embodiment of the present application. As shown in FIG. 2, a process includes the steps described below.

In step S202, a path computation request is sent to a parent path computation element (PCE), where the path computation request is used for making a request to acquire a path from a source node to a destination node, the source node and the destination node are located in different domains, the path includes one or more path segments, and the path computation request carries a compression identifier for identifying compression of the path segments and a path setup type (PST).

In step S204, a creation message from the parent PCE is received, where the creation message is sent by the parent PCE according to the compression identifier and the PST.

In step S206, the identification information about a path segment is compressed according to the creation message.

In step S208, the compressed identification information about the path is returned to the parent PCE.

The above-mentioned operations may be performed by a sub-PCE (such as, the first sub-PEC in embodiment one). The processing on the sub-PCE side is described in the embodiment two.

According to the above-mentioned steps, after identification information about the path from the source node to the destination node is acquired, the identification information about the path is compressed, and thereby the length of the identification information about the path is effectively reduced, and the problem of excessive length of the path identification information in the related art is solved.

In an optional embodiment, the step in which the identification information about the one or more path segments is compressed according to the creation message includes: path information about the one or more path segments carried in the above-mentioned creation message is determined; and that a tunnel is created according to the path information, and a binding segment-identification (Binding SID) is assigned to the created tunnel.

In an optional embodiment, the above-mentioned creation message is used for making a request to create at least one of the following tunnels: a Resource Reservation Protocol-Traffic Engineering (RSVP-TE) tunnel; or a Segment Routing-Traffic Engineering (SR-TE) tunnel. It is to be noted that the embodiment about the RSVP-TE tunnel and the embodiment about the SR-TE tunnel are merely two preferred embodiments, and other types of tunnels may be created according to actual conditions and technological developments, and are not limited herein.

In an optional embodiment, the step in which the tunnel is created according to the path information includes: the tunnel is instantiated according to the path information, and that the creation message is forwarded to a path computation client (PCC) as a starting node of the tunnel to be created. The creation message is used for instructing the PCC to initiate, according to the path information, a process of creating the tunnel. In the embodiment, the tunnel is created by the PCC.

In an optional embodiment, when the types of tunnels to be created are different, specific operations the PCC is instructed to perform are also different. Optionally, when the above-mentioned creation message is used for making a request to create the RSVP-TE tunnel, the creation message is used for instructing the PCC to initiate an RSVP-TE signaling setup path; and optionally, when the above-mentioned creation message is used for making a request to create the SR-TE tunnel, the creation message is used for instructing the PCC to compute forwarding information about the path according to segment routing information.

In an optional embodiment, how to assign the Binding SID to the created tunnel is described as follows: in condition that a segment-identification (SID) is assigned by a controller globally and uniformly, after the tunnel is instantiated according to the above-mentioned path information, the Binding SID is assigned to the tunnel and reported to the parent PCE and the PCC; and/or in condition that the SID is assigned by a forwarding device and where the assigned SID is reported to the controller, the Binding SID assigned by the PCC to the tunnel after the above-mentioned PCE creates the tunnel is received and reported to the parent PCE.

In an optional embodiment, after the compressed identification information about the one or more path segments is returned to the parent PCE, the method further includes: compressed identification information about the path from the parent PCE is received. In condition that the above-mentioned path computation request is initiated by a predetermined path computation client (PCC), the compressed identification information about the path is returned to the predetermined PCC; and in condition that the path computation request is not initiated by the predetermined path computation client (PCC), the compressed identification information about the path is sent to a PCC as a starting node of the tunnel.

Embodiment Three

The present application is described from the parent PCE side and the sub-PCE side in the above-mentioned embodiments, and will be described below as a whole.

In the embodiment, in an SR-TE tunnel that is initiated and established by the PCC side or an SR-TE tunnel that is initiatively created by the PCE the ability to compress possible path segments is explicitly configured. An ability flag (corresponding to the compression identifier described above) will be included in a path computation request initiated by the PCC to the PCE (and the sub-PCE to the parent PCE). According to the ability flag, a parent PCE triggers a sub-PCE of each domain to additionally create an RSVP-TE tunnel (or SR-TE tunnel) according to a corresponding path segment. Each sub-PCE initiatively assigns a Binding SID to the additionally created RSVP-TE tunnel (or SR-TE tunnel) or acquires the Binding SID from a head node PCC of the RSVP-TE tunnel (or SR-TE tunnel). Each sub-PCE synchronizes the Binding SID to the parent PCE, the parent PCE applies the Binding SID in a segment routing SID list corresponding to a complete cross-domain TE path and replies to the sub-PCE initiating the path computation request to the parent PCE, and the PCE delivers the Binding SID to its PCC. The PCC encapsulates a packet by using the SID list and forwards the encapsulated packet.

A method of cross-domain TE path computation and packet forwarding provided in the embodiment specifically includes the steps below.

A first step is described below.

In an SR-TE tunnel that is initiated and established by the PCC side or an SR-TE tunnel that is initiatively created by the PCE, the ability to compress possible path segments is explicitly configured. The specific compression capability may be as follows.

Option1: No compression is performed.

Option2: Only the RSVP-TE tunnel is additionally created for path segments.

Option3: Only the SR-TE tunnel is additionally created for path segments.

Option4: The RSVP-TE tunnel or the SR-TE tunnel is additionally created for path segments, which is not limited.

If the ability is configured as Option1, the method described in the embodiment of the present application is the same as a method described in RFC 6805. In the embodiment, the description is mainly for Option2 or Option3 or Option4, and Option2, Option3, and Option4 are uniformly referred to as "to be compressed" for ease of description. It should be noted that in addition to the above-mentioned four Options, other options may be extended and supported similarly in the future.

A second step is described below.

For computation of a cross-domain TE path, according to the method described in RFC 6805, for the SR-TE tunnel initiated and established by the PCC side, the PCC initiates a path computation request to a sub-PCE (referred to as sub-PCE1) in a domain where the SR-TE tunnel is located, or for the SR-TE tunnel initiatively established by the sub-PCE1, the sub-PCE1initiates the path computation request to the parent PCE. The path computation request message indicates that the PST is "path setup using the segment routing technique" and also includes a compression ability flag of the path segment described above. It is assumed that the request message further includes a path name, i.e., path-name-SD.

According to the method described in RFC 6805, the parent PCE firstly computes, according to the domain-level topology information the parent PCE maintains, which domain sequences the cross-domain TE path may traverse, and then for each domain sequence, initiates a path computation request within each domain to a sub-PCE in the each domain. It is to be noted that the path computation request message sent by the parent PCE to each sub-PCE is only used to acquire potential paths for selecting an optimal path. Therefore the path segment compression identifier included in the message has to be "No compression is performed", and the PST may still be "path setup using the segment routing technique". The parent PCE eventually computes an optimal cross-domain TE path from a number of domain sequences. The TE path may include an IP address list or a SID list corresponding to a specific path segment within each domain, or a path-key corresponding to the specific path segment within each domain.

It is to be noted that since the PST is "path setup using the segment routing technique", each sub-PCE may attempt to reply to the parent PCE with the SID list, and certainly it is also allowed by the protocol to reply to the parent PCE with either an IP address list or an IP address+SID combination list. The description equally applies when the parent PCE replies to the sub-PCE1 with the complete TE path.

Each sub-PCE may generally collect, through the BGP-LS, topology information within the domain the each sub-PCE is responsible for and inter-domain link information about connection of the domain to other domains, and each sub-PCE needs to report the inter-domain link information to the parent PCE through the BGP-LS. In addition to the BGP-LS, other channels may also be used, which is not limited in the embodiment of the present application.

A third step is described below.

Unlike the method described in RFC 6805, now the parent PCE does not immediately reply to the sub-PCE1 with the above-mentioned optimal complete TE path, but finds after checking that the path segment compression identifier included in the path computation request message sent to the parent PCE by the sub-PCE1 indicates "to be compressed", so the parent PCE sends an "initiatively creating tunnel" message to the sub-PCE corresponding to each domain for each path segment in each domain in each optimal complete path. The message at least includes: a pathname, the path segment information, the starting node (that is, the first node of the path segment) and the destination node (that is, the last node of the path segment) information about the tunnel to be created and the PST. For the pathname, the complete pathname (i.e., path-name-SD) may be followed by something, such as path-name-SD-head node of the path segment-last node of the path segment, so as to be globally unique. The path segment information is returned to the parent PCE by the corresponding sub-PCE before, but now is in turn provided as an ERO by the parent PCE to the sub-PCE to create a tunnel. The starting node and the destination node of the tunnel to be created are the head node and the end node of the corresponding path segment respectively. The PST is to be set accord to the path segment compression identifier described above. If the path segment compression identifier is Option2, the PST is set to be "path setup using the RSVP-TE signaling", if the path segment compression identifier is Option3, the PST is set to be "path setup using the segment routing technique", and if the path segment compression identifier is Option4, the PST is set to be "path setup using the RSVP-TE signaling or the segment routing technique".

A fourth step is described below.

After the sub-PCE corresponding to each domain receives a "initiatively creating tunnel" message from the parent PCE, the corresponding tunnel is instantiated locally, the "initiatively creating tunnel" message is forwarded to the starting node PCC of the tunnel to be created, and the PCC initiates the path setup in the network according to the PST and the ERO given in the message. For example, the PST is "path setup using the RSVP-TE signaling", and then the PCC initiates an RSVP-TE signaling path setup. For example, the PST is "path setup using the segment routing technique", and then the PCC directly computes the forwarding information about the path according to the segment routing information. For example, the PST is "path setup using the RSVP-TE signaling or path setup using the segment routing technique", and then the PCC chooses, according to its own actual ability, to initiate the RSVP-TE signaling path setup or directly compute the forwarding information about the path according to the segment routing information.

In a deployment scenario in which a SID is assigned by a controller globally and uniformly, after the corresponding tunnel is instantiated, the sub-PCE corresponding to each domain may initiatively assign a Binding SID to the corresponding tunnel, report the Binding SID to the parent PCE and delivers the Binding SID to the PCC. In a deployment scenario in which the SID is configured by a forwarding device side and reported to the controller, the starting node PCC of the corresponding tunnel may assign the corresponding Binding SID to the tunnel and report the Binding SID to the sub-PCE after the tunnel is established, and the sub-PCE continues to report the Binding SID to the parent PCE.

It is to be noted that the Binding SID assigned to the tunnel has local attributes and generally does not need to be globally unique. If global uniqueness is required, a scenario should be deployed in which the controller assigns the SID globally and uniformly, and SID resource pools controlled by sub-PCEs should not overlap each other, either by management or in other dynamic learning manners.

A fifth step is described below.

After the parent PCE receives the Binding SID of the created tunnel corresponding to the path segment in the corresponding domain from each sub-PCE, the SID list corresponding to an original complete TE path may be shortened and optimized. Actually, regardless of the path segment information with which each sub-PCE replies to the parent PCE before being the IP address list or the SID list or a combination of the IP address list and the SID list, or even a path-key, the parent PCE does not care about the specific ERO content of the path segment information, and the path segment needs only to be represented by its Binding SID in the SID list corresponding to the complete TE path. In addition, in combination with the corresponding Peer-Adj SID of the inter-domain link, the shortened and optimized SID list of the complete TE path is generally {Binding SID1, Peer-Adj SID1, Binding SID2, Peer-Adj SID2, . . . , Binding SIDn}. It is to be noted that the node SID of the corresponding starting node may, but may not necessarily, also be inserted before each Binding SID and Peer-Adj SID in the SID list. In addition, in a special case, the Binding SID1 may not exist, for example, the starting node of the complete TE path happens to be the exit boundary node of the first domain in the domain sequence.

A sixth step is described below.

The parent PCE replies to the sub-PCE1 with the above-mentioned shortened and optimized SID list in response to a cross-domain TE path computation request message previously received from the sub-PCE1. The sub-PCE1 continues to reply, with the SID list, to the PCC from which the corresponding path computation request is received, or delivers the SID list to the head node PCC of the tunnel when the sub-PCE1 initiatively creates a cross-domain tunnel.

The PCC may use the SID list as the forwarding information about the cross-domain SR-TE tunnel. It is to be noted that if the first SID in the SID list is the Binding SID, the Binding SID actually refers to the forwarding information about the tunnel corresponding to the path segment of the domain where the PCC is located, so when the SR-TE tunnel finally generates the forwarding information, the first SID (Binding SID) is replaced with the forwarding information about the corresponding tunnel. Similarly, if the first SID in the SID list is the Peer-Adj SID, the first SID (Peer-Adj SID) is replaced with the forwarding information about the corresponding inter-domain link.

Compared with the existing art, the method in the embodiment of the present application can significantly shorten the segment routing SID list of the cross-domain TE path, reduce a depth of a label stack for encapsulating the packet, improve the packet load efficiency and avoid MTU fragmentation.

Embodiment Four

The implementation of the technical solution will be further described in detail with reference to the drawings.

Figure 3:
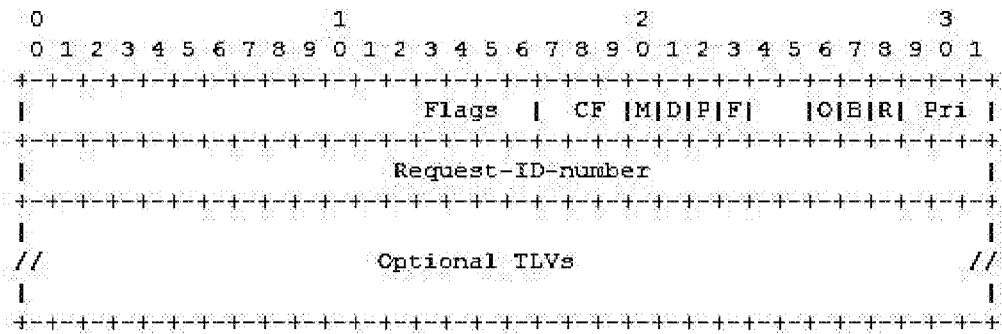
FIG. 3 is a schematic diagram of a Request Parameters (RP) object according to an embodiment of the present application.

FIG. 3 is a schematic diagram of an RP object according to an embodiment of the present application. On the basis of RP objects defined in RFC 5440, RFC 5520, RFC 5541 and RFC 5557, a Compress Flag (CF) intending to occupy three bits is added into a field of Flags to identify whether a path needs to be compressed, and the meanings of specific values are as follows.

0 denotes that the path does not need to be compressed.

1 denotes that compression is performed in a manner of additionally establishing only an RSVP-TE tunnel for path segments.

2 denotes that compression is performed in a manner of additionally establishing only an SR-TE tunnel for path segments.

3 denotes that compression is performed in a manner of additionally establishing the RSVP-TE tunnel or the SR-TE tunnel for path segments.

Figure 4:
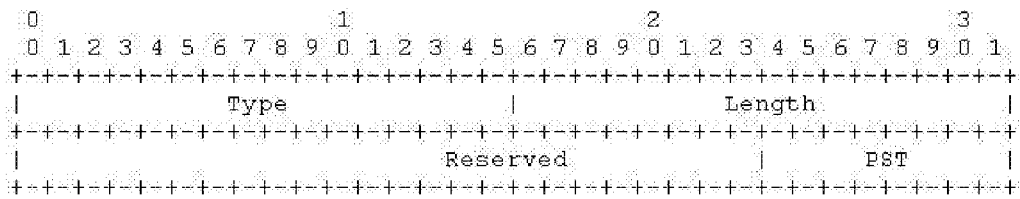
FIG. 4 is a schematic diagram of a Path Setup Type TLV according to an embodiment of the present application.

FIG. 4 is a schematic diagram of a Path Setup Type TLV according to an embodiment of the present application. On the basis of draft-ietf-pce-lsp-setup-type-04, a PST=2 is added to denote that a path setup technique may be "an RSVP-TE signaling or a segment routing technique". The Path Setup Type TLV may be carried in the RP object (reference to RFC 5440) and a Stateful PCE Request Parameters (SRP) object (reference to draft-ietf-pce-stateful-pce-18). At present, draft-ietf-pce-lsp-setup-type-04 defines PST=0, which denotes that the path setup technique adopts the RSVP-TE signaling, and draft-ietf-pce-segment-routing-09 defines PST=1, which denotes that the path setup technique adopts the segment routing technique.

Figure 5:
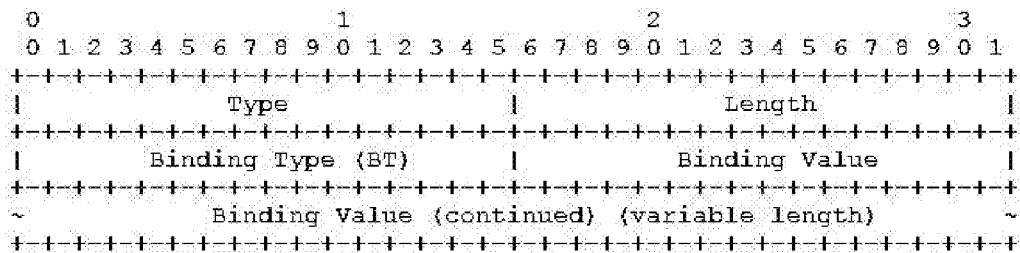
FIG. 5 is a schematic diagram of a TE-PATH-BINDING TLV according to an embodiment of the present application.

FIG. 5 is a schematic diagram of a TE-PATH-BINDING TLV according to an embodiment of the present application. A TE-PATH-BINDING TLV defined by draft-sivabalan-pce-binding-label-sid-02 is taken as a basis, and is extended in the usage manner. The draft-sivabalan-pce-binding-label-sid-02 defines the TE-PATH-BINDING TLV included in a Label Switched Path (LSP) object in a PCRpt message and used for reporting the Binding SID of a corresponding TE path from the PCC to the PCE. The embodiment follows the method to report the Binding SID of an additionally created tunnel for a path segment in a corresponding domain from a PCC to a sub-PCE and from the sub-PCE to a parent PCE, which is applicable to a deployment scenario in which a forwarding device side itself configures a SID and reports the SID to a controller. In addition, the embodiment also extends the usage of the LSP object described in draft-ietf-pce-stateful-pce-18 and draft-ietf-pce-pce-initiated-lsp-09, and respectively allows inclusion of the above-mentioned TE-PATH-BINDING TLV in the LSP object included in a PCUpd message and a PCInitiate message, for delivering the Binding SID of an additionally created tunnel for a path segment in a corresponding domain from the sub-PCE to the PCC, which is applicable to a deployment scenario in which the controller assigns the SID globally and uniformly.

Specific Embodiment One

Figure 6:
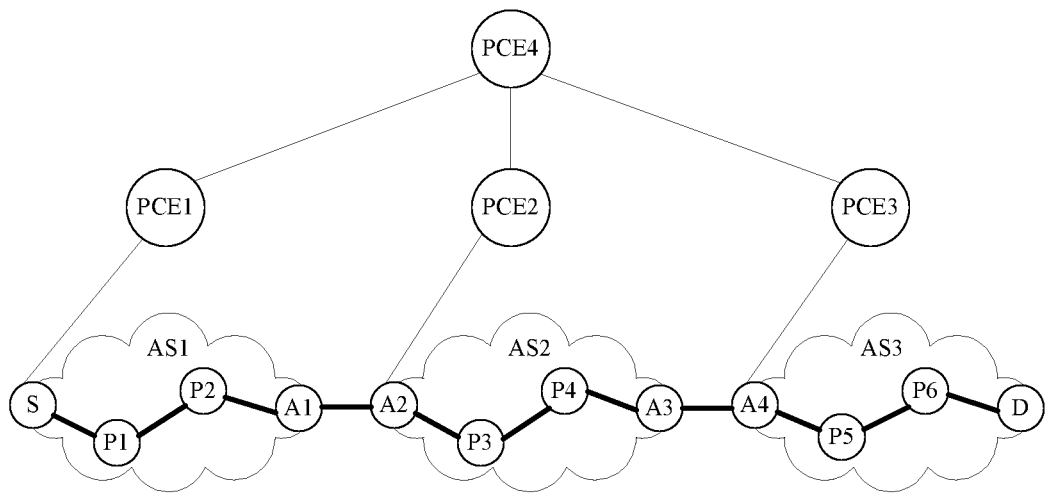
FIG. 6 is a diagram of a hierarchical PCE network architecture according to an embodiment of the present application.

FIG. 6 is a diagram of a hierarchical PCE network architecture according to an embodiment of the present application. Three domains are included, and respectively are AS1, AS2 and AS3. The corresponding sub-PCEs of AS1, AS2 and AS3 are a PCE1, a PCE2 and a PCE3 respectively, and a parent PCE is a PCE4. In the embodiment, it is assumed that the deployment scenario is provided in which a centralized controller uniformly assigns the SID and delivers the SID to a forwarding device; and that the PCE1 wants to initiatively create an SR-TE tunnel from a source node S to a destination node D, and that the PCE1 knows that border nodes of other ASs have been upgraded to be able to support the segment routing function and that internal nodes of other ASs (AS2, AS3) only support an RSVP-TE but do not support the segment routing function. Now, the specific steps in which the PCE1 initiatively creates one SR-TE tunnel from the source node S to the destination node D are described below.

In step 110, the PCE1 initiatively creates the SR-TE tunnel, the source node is S, and the destination node is D. The PCE1 finds, according to its own maintained Textease (TE) database (TED) information, that the destination node D does not belong to AS1, and then the PCE1 sends a PCReq message to the parent PCE (PCE4) for requesting computation of a cross-domain TE path. For a setting method of each field in the message, reference may be made to the RFC 5440 and draft-ietf-pce-stateful-pce-18 in combination with the solution in the embodiment of the present application. Only the main information strongly related to the processing flow in the embodiment of the present application is given below.

<RP object>: The PST is set to be 1 indicating the path setup using segment routing technique; and a CF flag is set to be 1, so as to perform compression by additionally creating an RSVP-TE tunnel for the path segment within each AS.

<END-POINTS object>: The source node is S, and the destination node is D.

<LSP object>: The path-name is set to be path-name-SD-100.

Other objects such as constraints will not be described in detail.

In step 120, after the PCE4 receives a request, the PCE4 firstly determines, according to the method described in RFC 6805, that the domain where the destination node is located is AS3, and then determines a possible domain sequence. In the embodiment, only one domain sequence exists, that is S-(AS1)-A1-A2-(AS2)-A3-A4-(AS3)-D. For the domain sequence, the PCE4 sends a PCReq message to the sub-PCE corresponding to each domain in the sequence, requesting computation of the path segment within each domain. For example, the PCE4 sends the PCReq message to the PCE1, requesting computation of the path segment from the source node S to the destination node A1. The main information in the message is described below.

<RP object>: The PST is set to be 1 indicating the path setup using segment routing technique; and a CF flag has to be set as 0, denoting that the path is not compressed.

<END-POINTS object>: The source node is S, and the destination node is A1.

The PCE4 also sends the PCReq message to the PCE2 for requesting computation of the path segment from the source node A2 to the destination node A3 and sends the PCReq message to the PCE3 for requesting computation of the path segment from the source node A4 to the destination node D. Details are not described here again.

In step 130, after each sub-PCE receives the path computation request from the PCE4, the respective path segment is computed and the PCRep message is sent to the PCE4. In the embodiment, the PCE1 will compute a path segment S-P1-P2-A1, the PCE2 will compute a path segment A2-P3-P4-A3, and the PCE3 will compute a path segment A4-P5-P6-D. In general, the path segment information is provided in an ERO object included in a PCERep message with which each sub-PCE replies to the PCE4, and may be an IP address list, a SID list, an IP address and SID combination list, or even may be a path-key for security reasons. However, in the embodiment, since the SR is not supported in each AS, the path segment information returned by each sub-PCE to the PCE4 may be the IP address list or the path-key.

In step 140, For domain sequence S-(AS1)-A1-A2-(AS2)-A3-A4-(AS3)-D, the PCE4 will obtain a complete end-to-end TE path after receiving the path segments of all domains from all sub-PCEs. In the embodiment, since no other domain sequence exist, the complete TE path described above will serve as an optimal path. At the moment, the PCE4 does not immediately reply to the PCE1 with the optimal complete TE path, but finds after checking that the CF flag in the corresponding path computation request received from the PCE1 is 1, and then initiatively creates the RSVP-TE tunnel for each path segment and sends a PCInitiate message to each sub-PCE. For example, the PCE4 additionally creates a corresponding RSVP-TE tunnel internally for a path segment S-P1-P2-A1 in AS1. An included main path may be named path-name-SD-100-SA1 (note: the naming method is to add head and tail key information, i.e., respectively S and A1, of a child path to the tail of a parent path name, i.e., path-name-SD-100, to ensure global uniqueness). Accordingly, in the PCInitiate message sent from the PCE4 to the PCE1, the main information is as follows.

<SRP object>: The PST is set to be 0 indicating path setup using the RSVP-TE.

<LSP object>: The path-name is set to be path-name-SD-100-SA1.

<END-POINTS object>: The source node is S, and the destination node is A1.

<ERO object>: The S-P1-P2-A1 specifically may be the IP address list or the path-key, that is, the path segment information previously received from the PCE1 is filled in intact.

The PCE4 also additionally creates a corresponding RSVP-TE tunnel internally for a path segment A2-P3-P4-A3 in AS2. An included main path may be named path-name-SD-100-A2A3, and accordingly, the PCInitiate message is sent to the PCE2. The PCE4 also additionally creates a corresponding RSVP-TE tunnel internally for a path segment A4-P5-P6-D in AS3. An included main path may be named path-name-SD-100-A4D, and accordingly, the PCInitiate message is sent to the PCE3. Details are not described here again.

In step 150, after each sub-PCE receives the PCInitiate message from the PCE4, each sub-PCE will also initiatively create a corresponding RSVP-TE tunnel internally and continue to send the PCInitiate message to a head node PCC of the tunnel. It is to be noted that in the PCInitiate message that each sub-PCE continues to send to the head node PCC of the tunnel, the ERO object includes a clear strict hop-by-hop explicit path, which may be the IP address list but not the path-key. Each head node of the tunnel will establish a path within the network through the RSVP-TE signaling and negotiate labels.

In the embodiment, after each sub-PCE has created a corresponding RSVP-TE tunnel, each sub-PCE will also initiatively assign a Binding SID to the RSVP-TE tunnel. For example, the PCE1 assigns the Binding SID=1000 to the above-mentioned created RSVP-TE tunnel, the PCE2 assigns the Binding SID=2000 to the above-mentioned created RSVP-TE tunnel, and the PCE3 assigns the Binding SID=3000 to the above-mentioned created RSVP-TE tunnel. Each sub-PCE may deliver the Binding SID to the head node PCC of the tunnel along with the above-mentioned PCInitiate message or a subsequent PCUpd message, and may also report the Binding SID to the PCE4 along with the PCRpt message. After receiving the Binding SID, each head node of the tunnel will establish a label table entry with the Binding SID as a key value to guide the packet to be forwarded to the tunnel. The label operation is to exchange the incoming label Binding SID into the outgoing label included in the RSVP-TE tunnel.

It is to be noted that each sub-PCE also assigns a Peer-to-Adj SID to an inter-domain link between the domain the sub-PCE is responsible for and another domain, and reports the Peer-to-Adj SID to the PCE4 through a BGP-LS.

In step 160, after the PCE4 receives the reported Binding SIDs of all the sub-PCEs, the original complete TE path may be represented by the compressed SID list and replied to the PCE1 through the PCRep message, and the compressed SID list in the embodiment may be: {1000, Peer-Adj-SID-A1A2, 2000, Peer-Adj-SID-A3A4, 3000}.

In step 170, after the PCE1 receives the PCRep message from the PCE4, the PCE1 continues to send the PCInitiate message to the S node PCC to trigger the instantiation of the corresponding SR-TE tunnel on the S node, where the above-mentioned compressed SID list is included.

The corresponding SR-TE tunnel will be created on the S node. When a forwarding table entry is generated for the SR-TE tunnel, the first SID, that is, 1000, in the SID list described above, will be replaced with the forwarding information about the corresponding RSVP-TE tunnel by searching the label table entry, and the other SIDs will remain unchanged.

In step 180, on the S node, the packet sent to the above-mentioned SR-TE tunnel will be pressed onto the corresponding label stack: {RSVP-TE tunnel-SA1 label, Peer-Adj-SID-A1A2, 2000, Peer-Adj-SID-A3A4, 3000}, that is, the top layer label is the outgoing label corresponding to the additionally created RSVP-TE tunnel for the path segment in above-mentioned AS1, the lower layer label is the Peer-Adj SID corresponding to the inter-domain link A1-A2, the further lower layer label is the Binding SID corresponding to the additionally created RSVP-TE tunnel for the path segment in AS2, the further lower layer label is the Peer-Adj SID corresponding to the inter-domain link A3-A4, and the further lower layer label is the Binding SID corresponding to the additionally created RSVP-TE tunnel for the path segment in AS3. The packet will be forwarded along a desired cross-domain TE path.

Specific Embodiment Two

The specific embodiment is basically similar to the specific embodiment one, except that a deployment scenario in which the SID is assigned by a forwarding device side and is reported (such as through the BGP-LS) to the controller is provided in the embodiment. Then, the PCE1 initiatively establishes one cross-domain SR-TE tunnel from the source node S to the destination node D, and the processes are basically similar to those in the specific embodiment one, except that the Binding SID of the RSVP-TE tunnel additionally created for the path segment of each domain involved is assigned by the head node itself of the tunnel and reported to the corresponding sub-PCE through the PCRpt message, and that the sub-PCE continues to report the Binding SID to the PCE4 through the PCRpt message, and the other processes are the same as those in the embodiment one.

Specific Embodiment Three

The specific embodiment is basically similar to the specific embodiment one, except that the S node establishes one cross-domain SR-TE tunnel from the source node S to the destination node D in the embodiment, and that the S node PCC sends the PCReq message to the PCE1, where the message is same as the PCReq message sent by the PCE1 to the PCE4 in the embodiment one, and the other processes are the same as those in the embodiment one, and finally the PCE1 sends the PCRep message to reply to the S node PCC with the path computation result, where the compressed SID list is included.

Specific Embodiment Four

The specific embodiment is basically the same as the specific embodiment one, except that all domains have been upgraded to support the segment routing function and that the RSVP-TE is no longer supported on the network. Now, the step in which the PCE1 initiatively creates one SR-TE tunnel from the source node S to destination node D includes the specific steps described below.

In step 410, the PCE1 initiatively creates the SR-TE tunnel, the source nose is S, and the destination node is D. The PCE1 finds, according to its own maintained TE database (TED) information, that the destination node D does not belong to AS1, and then the PCE1 sends the PCReq message to the parent PCE (PCE4) for requesting computation of the cross-domain TE path. For a setting method of each field in the message, reference may be made to the RFC 5440 and draft-ietf-pce-stateful-pce-18 in combination with the solution in the embodiment of the present application, and only the main information strongly related to the processing flow in the embodiment of the present application is given below.

<RP object>: The PST is set to be 1 indicating path setup using the segment routing technique; a CF flag is set to be 2, so as to perform compression by additionally creating an RSVP-TE tunnel for the path segment within each AS.

<END-POINTS object>: The source node is S, and the destination node is D.

<LSP object>: The path-name is set to be path-name-SD-100.

Other objects such as constraints will not be described in detail.

In step 420, after the PCE4 receives the request, the PCE4 firstly determines, according to the method described in RFC 6805, the domain where the destination node is located is AS3, and then determines a possible domain sequence. In the embodiment, only one domain sequence exists, that is S-(AS1)-A1-A2-(AS2)-A3-A4-(AS3)-D. For the domain sequence, the PCE4sends the PCReq message to the sub-PCE corresponding to each domain in the sequence, requesting computation of the path segment within each domain.

For example, the PCE4 sends the PCReq message to the PCE1 for requesting computation of the path segment from the source node S to the destination node A1, and the main information in the message is described below.

<RP object>: The PST is set to be 1 indicating path setup using the segment routing technique; a CF flag has to be set as 0, denoting that the path is not compressed.

<END-POINTS object>: The source node is S, and the destination node is A1.

The PCE4 also sends the PCReq message to the PCE2 for requesting computation of the path segment from the source node A2 to the destination node A3 and sends the PCReq message to the PCE3 for requesting computation of the path segment from the source node A4 to the destination node D. Details are not described here again.

In step 430, after each sub-PCE receives the path computation request from the PCE4, the respective path segment is computed and the PCRep message is sent to the PCE4. In the embodiment, the PCE1 will compute the path segment S-P1-P2-A1, the PCE2 will compute the path segment A2-P3-P4-A3, and the PCE3 will compute the path segment A4-P5-P6-D. In general, the path segment information is provided in an ERO object included in a PCERep message with which each sub-PCE replies to the PCE4, and may be the IP address list, the SID list, the IP address and SID combination list, or even may be a path-key for security reasons. However, in the embodiment, since the SR is supported by each AS, the path segment information returned by each sub-PCE to the PCE4 may be the SID list or the path-key.

In step 440, for domain sequence S-(AS1)-A1-A2-(AS2)-A3-A4-(AS3)-D, the PCE4 will obtain the complete end-to-end TE path after receiving the path segments of all domains from all sub-PCEs. In the embodiment, since no other domain sequence exists, the above-mentioned complete TE path will serve as the optimal path. At the moment, the PCE4 does not immediately reply to the PCE1 with the optimal complete TE path, but finds after checking that the CF flag in the corresponding path computation request received from the PCE1 is 2, and then initiatively creates the SR-TE tunnel for each path segment and sends the PCInitiate message to each sub-PCE. For example, the PCE4 additionally creates a corresponding SR-TE tunnel internally for a path segment S-P1-P2-A1 in AS1. An included main path may be named path-name-SD-100-SA1 (note: the naming method is to add head and tail key information, i.e., respectively S and A1, of a child path to the tail of a parent path name, i.e., path-name-SD-100, to ensure global uniqueness). Accordingly, in the PCInitiate message sent from the PCE4 to the PCE1, the main information is as follows.

<SRP object>: The PST is set to be 1 indicating path setup using the segment routing technique.

<LSP object>: The path-name is set to be path-name-SD-100-SA1.

<END-POINTS object>: The source node is S, and the destination node is A1.

<ERO object>: S-P1-P2-A1 specifically may be the SID list or the path-key, that is, the path segment information previously received from the PCE1 is filled in intact.

The PCE4 also additionally creates a corresponding SR-TE tunnel internally for a path segment A2-P3-P4-A3 in AS2. An included main path may be named path-name-SD-100-A2A3, and accordingly, the PCInitiate message is sent to the PCE2. The PCE4 also additionally creates the corresponding SR-TE tunnel internally for the path segment A4-P5-P6-D in AS3. An included main path may be named path-name-SD-100-A4D, and accordingly, the PCInitiate message is sent to the PCE3. Details are not described here again.

In step 450, after each sub-PCE receives the PCInitiate message from the PCE4, each sub-PCE will also initiatively create the corresponding SR-TE tunnel internally and continue to send the PCInitiate message to the head node PCC of the tunnel. It is to be noted that in the PCInitiate message that each sub-PCE continues to deliver to the head node PCC of the tunnel, the ERO object includes a clear SID list, not the path-key. Each head node of the tunnel will generate a corresponding SR-TE tunnel, and the forwarding information is generated by using the corresponding SID list.

In the embodiment, after each sub-PCE has created a corresponding SR-TE tunnel, each sub-PCE will also initiatively assign the Binding SID to the SR-TE tunnel. For example, the PCE1 assigns the Binding SID=1000 to the above-mentioned created SR-TE tunnel, the PCE2 assigns the Binding SID=2000 to the above-mentioned created SR-TE tunnel, and the PCE3 assigns the Binding SID=3000 to the above-mentioned created SR-TE tunnel. Each sub-PCE may deliver the Binding SID to the head node PCC of the tunnel along with the above-mentioned PCInitiate message or the subsequent PCUpd message, and may also report the Binding SID to the PCE4 along with the PCRpt message. After receiving the Binding SID, each head node of the tunnel will establish the label table entry with the Binding SID as the key value to guide the packet to be forwarded to the tunnel. The label operation is to exchange the incoming label Binding SID into the outgoing label stack included in the SR-TE tunnel.

It is to be noted that each sub-PCE also assigns the Peer-Adj SID to an inter-domain link between the domain the sub-PCE is responsible for and another domain, and reports the Peer-Adj SID to the PCE4 through the BGP-LS.

In step 460, after the PCE4 receives the reported Binding SIDs of all the sub-PCEs, the original complete TE path may be represented by the compressed SID list and replied to the PCE1 through the PCRep message, and the compressed SID list in the embodiment may be: {1000, Peer-Adj-SID-A1A2, 2000, Peer-Adj-SID-A3A4, 3000}.

In step 470, after the PCE1 receives the PCRep message from the PCE4, the PCE1 continues to send the PCInitiate message to the S node PCC to trigger the instantiation of the corresponding SR-TE tunnel on the S node, where the above-mentioned compressed SID list is included.

The corresponding SR-TE tunnel will be created on the S node. When a forwarding table entry is generated for the SR-TE tunnel, the first SID, i.e., 1000, in the above-mentioned SID list will be replaced with the forwarding information (generally a label stack) about the corresponding SR-TE tunnel by searching the label table entry, and the other SIDs will remain unchanged.

In step 480, on the S node, the packet sent to the above-mentioned SR-TE tunnel will be pressed onto the corresponding label stack: {SR-TE tunnel-SA1 SID list, Peer-Adj-SID-A1A2, 2000, Peer-Adj-SID-A3A4, 3000}, that is, the top layer label is the outgoing label stack corresponding to the additionally created SR-TE tunnel for the path segment in above-mentioned AS1, the lower layer label is the Peer-Adj SID corresponding to the inter-domain link A1-A2, the further lower layer label is the Binding SID corresponding to the additionally created SR-TE tunnel for the path segment in AS2, the further lower layer label is the Peer-Adj SID corresponding to the inter-domain link A3-A4, and the further lower layer label is the Binding SID corresponding to the additionally created SR-TE tunnel for the path segment in AS3. The packet will be forwarded along the desired cross-domain TE path.

Specific Embodiment Five

The specific embodiment is basically similar to the specific embodiment four, except that the deployment scenario in which the SID is assigned by a forwarding device side and is reported (such as through the BGP-LS) to the controller is provided in the embodiment. Then, the PCE1 initiatively establishes one cross-domain SR-TE tunnel from the source node S to the destination node D, and the processes are basically similar to those in the embodiment four, nothing except that the Binding SID of the SR-TE tunnel additionally created for the path segment of each domain involved is assigned by the head node itself of the tunnel and reported to the corresponding sub-PCE through the PCRpt message, and that the sub-PCE continues to report the Binding SID to the PCE4 through the PCRpt message, and the other processes are the same as those in the embodiment four.

Specific Embodiment Six

The specific embodiment is basically similar to the specific embodiment four, except that the S node establishes one cross-domain SR-TE tunnel from the source node S to the destination node D in the embodiment, and that the S node PCC sends the PCReq message to the PCE1, where the message is same as the PCReq message sent by the sub-PCE1 to the PCE4 in the specific embodiment one, and the other processes are the same as those in the embodiment one, and finally the PCE1 sends the PCRep message to reply to the S node PCC with the path computation result, where the compressed SID list is included.

Specific Embodiment Seven

The specific embodiment is basically the same as the specific embodiment one, except that all AS1s and AS2s have been upgraded to support the segment routing function and no longer support the RSVP-TE, and that for the AS3, only boundary nodes are upgraded to support the segment routing function and that internal nodes still support the RSVP-TE only. Now, the step in which the PCE1 initiatively creates one SR-TE tunnel from the source node S to destination node D includes the specific steps described below.

In step 710, the PCE1 initiatively creates the SR-TE tunnel, the source node is S, and the destination node is D. The PCE1 finds, according to its own maintained TE database (TED) information, that the destination node D does not belong to AS1, and then the PCE1 sends a PCReq message to the parent PCE (PCE4) for requesting computation of the cross-domain TE path. For disposing setting method of each field in the message, reference may be made to the RFC 5440 and draft-ietf-pce-stateful-pce-18 in combination with the solution in the embodiment of the present application, and only the main information strongly related to the processing flow in the embodiment of the present application is given below.

<RP object>: The PST is set to be 1 indicating path setup using the segment routing technique; the CF flag is set to be 3, so as to perform compression by additionally creating the RSVP-TE tunnel or the SR-TE tunnel for the path segment within each AS according to actual abilities.

<END-POINTS object>: The source node is S, and the destination node is D.

<LSP object>: The path-name is set to be path-name-SD-100.

Other objects such as constraints will not be described in detail.

In step 720, after the PCE4 receives the request, the PCE4 first determines, according to the method described in RFC 6805, that the domain where the destination node is located is AS3, and then determines the possible domain sequence. In the embodiment, only one domain sequence exists, that is S-(AS1)-A1-A2-(AS2)-A3-A4-(AS3)-D. For the domain sequence, the PCE4 sends the PCReq message to the sub-PCE corresponding to each domain in the sequence, requesting computation of the path segment within each domain. For example, the PCE4 sends the PCReq message to the PCE1, requesting computation of the path segment from the source node S to the destination node A1, and the main information in the message is described below.

<RP object>: The PST is set to be 1 indicating path setup using the segment routing technique; the CF flag has to be set as 0 indicating that the path is not compressed.

<END-POINTS object>: The source node is S, and the destination node is A1.

The PCE4 also sends the PCReq message to the PCE2 for requesting computation of the path segment from the source node A2 to the destination node A3 and sends the PCReq message to a PCE3 for requesting computation of the path segment from the source node A4 to the destination node D. Details are not described here again.

In step 730, after each sub-PCE receives the path computation request from the PCE4, the respective path segment is computed and the PCRep message is sent to the PCE4. In the embodiment, the PCE1 will compute the path segment S-P1-P2-A1, the PCE2 will compute the path segment A2-P3-P4-A3, and the PCE3 will compute the path segment A4-P5-P6-D. In general, the path segment information is provided in the ERO object included in the PCERep message with which each sub-PCE replies to the PCE4, and may be the IP address list, the SID list, and the IP address and SID combination list, or even may be a path-key for security reasons. In the embodiment, since the SR is supported by each AS1 and each AS2, the path segment information returned by the PCE1 and the PCE2 to the PCE4 may be the SID list or the path-key. Since the SR is only supported by the boundary nodes of AS3, the path segment information with which the PCE3 replies to the PCE4 may be the IP address list or the path-key.

In step 740, for domain sequence S-(AS1)-A1-A2-(AS2)-A3-A4-(AS3)-D, the PCE4 will obtain the complete end-to-end TE path after receiving the path segments of all domains from all sub-PCEs. In the embodiment, since no other domain sequence exists, the above-mentioned complete TE path will serve as the optimal path. At the moment, the PCE4 does not immediately reply to the PCE1 with the optimal complete TE path, but finds after checking that the CF flag in the corresponding path computation request received from the PCE1 is 3, and then initiatively creates the TE tunnel (the RSVP-TE tunnel or the SR-TE tunnel) for each path segment and sends the PCInitiate message to each sub-PCE. For example, the PCE4 additionally creates the corresponding TE tunnel internally for the path segment S-P1-P2-A1 in AS1. An included main path may be named path-name-SD-100-SA1 (note: the naming method is to add head and tail key information, i.e., respectively S and A1 of the child path to the tail of a parent path name, i.e., path-name-SD-100 to ensure global uniqueness). Accordingly, in the PCInitiate message sent from the PCE4 to the PCE1, the main information is as follows.

<SRP object>: The PST is set to be 2 indicating path setup using the RSVP-TE signaling or the segment routing technique.

<LSP object>: The path-name is set to be path-name-SD-100-SA1.

<END-POINTS object>: The source node is S, and the destination node is A1.

<ERO object>: S-P1-P2-A1 specifically may be the SID list or the path-key, that is, the path segment information previously received from the PCE1 is filled in intact.

The PCE4 also additionally creates the corresponding TE tunnel internally for the path segment A2-P3-P4-A3 in AS2. An included main path may be named path-name-SD-100-A2A3, and accordingly, the PCInitiate message is sent to the PCE2. The PCE4 also additionally creates the corresponding TE tunnel internally for the path segment A4-P5-P6-D in AS3. An included main path may be named path-name-SD-100-A4D, and accordingly, the PCInitiate message is sent to the PCE3. Details are not described here again.

In step 750, after the PCE1 and the PCE2 respectively receive the PCInitiate messages from the PCE4, the PCE1 and the PCE2 will respectively and initiatively create the SR-TE tunnel internally according to their respective self-ability and respectively continue to send the PCInitiate message to the head node PCC of the tunnel. After the PCE3 receives the PCInitiate message from the PCE4, the PCE3 initiatively creates the corresponding RSVP-TE tunnel internally according to the self-ability and continues to send the PCInitiate message to the head node PCC of the tunnel. It is to be noted that in the PCInitiate message that a sub-PCE1 and a sub-PCE2 continue to send to the head node PCC of the tunnel, the ERO object includes the clear SID list, not the path-key. In the PCInitiate message that a sub-PCE3 continues to send to the head node PCC of the tunnel, the ERO object includes a clear SID list, not the path-key. The head nodes of the tunnels in AS1 and AS2 will respectively generate the corresponding SR-TE tunnel, and the forwarding information is generated using the respective SID list. The head node of the tunnel in AS3 will generate the corresponding RSVP-TE tunnel, and establish the path within the network through the RSVP-TE signaling and negotiate labels.

In the specific embodiment, after each sub-PCE has created the corresponding SR-TE tunnel or RSVP-TE tunnel, each sub-PCE will also initiatively assign the Binding SID to the TE tunnel. For example, the PCE1 assigns the Binding SID=1000 to the above-mentioned created SR-TE tunnel, the PCE2 assigns the Binding SID=2000 to the above-mentioned created SR-TE tunnel, and the PCE3 assigns the Binding SID=3000 to the above-mentioned created RSVP-TE tunnel. Each sub-PCE may deliver the Binding SID to the head node PCC of the tunnel along with the above-mentioned PCInitiate message or the subsequent PCUpd message, and may also be reported to the PCE4 along with the PCRpt message. After receiving the Binding SID, each head node of the tunnel will establish the label table entry with the Binding SID as the key value to guide the packet to be forwarded to the tunnel. The label operation is to exchange the incoming label Binding SID into the corresponding outgoing label stack included in the SR-TE tunnel or into the outgoing label included in the RSVP-TE tunnel.

It is to be noted that each sub-PCE also assigns the Peer-Adj SID to the inter-domain link between the domain the sub-PCE is responsible for and another domain, and reports the Peer-Adj SID to the PCE4 through the BGP-LS.

In step 760, after the PCE4 receives the reported Binding SIDs of all the sub-PCEs, the original complete TE path may be represented by the compressed SID list and replied to the PCE1 through the PCRep message, and the compressed SID list in the embodiment may be: {1000, Peer-Adj-SID-A1A2, 2000, Peer-Adj-SID-A3A4, 3000}.

In step 770, after the PCE1 receives the PCRep message from the PCE4, the PCE1 continues to send the PCInitiate message to the S node PCC to trigger the instantiation of the corresponding SR-TE tunnel on the S node, where the compressed SID list is included.

The corresponding SR-TE tunnel will be created on the S node. When the forwarding table entry is generated for the SR-TE tunnel, the first SID, that is, 1000, in the SID list described above will be replaced with the forwarding information (generally one label stack) about the corresponding SR-TE tunnel by searching the label table entry, and the other SIDs will remain unchanged.

In step 780, on the S node, the packet sent to the above-mentioned SR-TE tunnel will be pressed onto the corresponding label stack: {SR-TE tunnel-SA1 SID list, Peer-Adj-SID-A1A2, 2000, Peer-Adj-SID-A3A4, 3000}, that is, the top layer label is the outgoing label stack corresponding to the additionally created SR-TE tunnel for the path segment in above-mentioned AS1, the lower layer label is the Peer-Adj SID corresponding to the inter-domain link A1-A2, the further lower layer label is the Binding SID corresponding to the additionally created SR-TE tunnel for the path segment in AS2, the further lower layer label is the Peer-Adj SID corresponding to the inter-domain link A3-A4, and the further lower layer label is the Binding SID corresponding to the additionally created RSVP-TE tunnel for the path segment in AS3. The packet will be forwarded along the desired cross-domain TE path.

Embodiment Five

From the description of the above-mentioned embodiments, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the solution provided by the present application substantially, or the part contributing to the existing art, may be embodied in the form of a software product. The computer software product is stored on a storage medium (such as a read-only memory (ROM)/random access memory (RAM), a magnetic disk or an optical disk) and includes several instructions for enabling a terminal device (which may be a mobile phone, a computer, a server or a network device) to execute the method according to each embodiment of the present application.

The present embodiment further provides an apparatus for determining identification information about a cross-domain path. The apparatus is used for implementing the above-mentioned embodiments and preferred embodiments. What has been described will not be repeated. As used below, the term "module" may be software, hardware or a combination thereof capable of implementing predetermined functions. The apparatus in the embodiments described below is preferably implemented by software, but implementation by hardware or by a combination of software and hardware is also possible and conceived.

Figure 7:
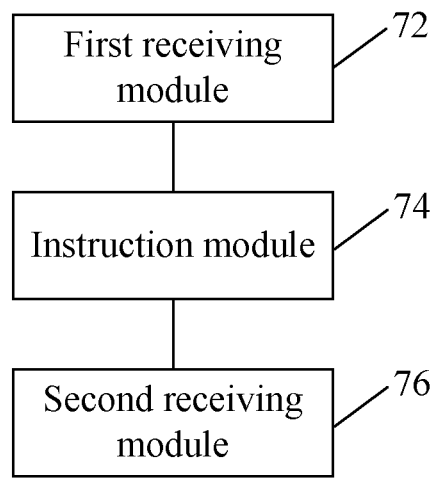
FIG. 7 is a structure diagram of a first apparatus for determining identification information about a cross-domain path according to an embodiment of the present application.

FIG. 7 is a structure diagram of a first apparatus for determining identification information about a cross-domain path according to an embodiment of the present application. As shown in FIG. 7, the apparatus includes a first receiving module 72, an instruction module 74 and a second receiving module 76. The apparatus is described below.

The first receiving module 72 is configured to receive a path computation request from a first path computation element PCE. The path computation request is used for making a request to acquire a path from a source node to a destination node, and the source node and the destination node are located in different domains. The above-mentioned path includes one or more path segments, and the above-mentioned path computation request carries a compression identifier for identifying compression of the one or more path segments and a path setup type (PST). The instruction module 74 is connected to the first receiving module 72 and configured to instruct, according to the compression identifier and the PST, each of sub-PCEs corresponding to the one or more path segments to compress identification information about a respective one of the one or more path segments after identification information about the path from the source node to the destination node is acquired. The second receiving module 76 is connected to the instruction module 74 and configured to receive the compressed identification information about the one or more path segments returned by the each of sub-PCEs corresponding to the one or more path segments, and combine, according to the identification information about the path, the compressed identification information about the one or more path segments into the identification information about the path.

In an optional embodiment, the instruction module 74 includes a sending element configured to send a creation message to the each of sub-PCEs corresponding to the one or more path segments according to the compression identifier, where the creation message is used for requesting the each of sub-PCEs corresponding to the one or more path segments to create a tunnel and assign a binding segment-identification (Binding SID) to the created tunnel. The creation message carries path information about the one or more path segments.

In an optional embodiment, the above-mentioned creation message being used for requesting the each of sub-PCEs corresponding to the one or more path segments to create the tunnel includes one of the following: the above-mentioned creation message is used for requesting the each of sub-PCEs corresponding to the one or more path segments to create a Resource Reservation Protocol-Traffic Engineering (RSVP-TE) tunnel; the above-mentioned creation message is used for requesting the each of sub-PCEs corresponding to the one or more path segments to create a Segment Routing technology-Traffic Engineering (ST-TE) tunnel; or the above-mentioned creation message is used for requesting the each of sub-PCEs corresponding to the one or more path segments to create the RSVP-TE tunnel or the SR-TE tunnel.

In an optional embodiment, the second receiving module 76 is configured to receive a Binding SID assigned to the created tunnel and returned by the each of sub-PCEs corresponding to the one or more path segments; and combine the received Binding SIDs returned by the sub-PCEs corresponding to the one or more path segments into the compressed identification information about the path.

In an optional embodiment, the above-mentioned path information includes the following contents: a path name of the path, segment information about the one or more path segments, starting node information and destination node information about the tunnel to be created, and the above-mentioned PST.

In an optional embodiment, the above-mentioned apparatus further includes a returning module, which is configured to return the compressed identification information about the path to the first sub-PCE after the compressed identification information about the one or more path segments are combined into the compressed identification information about the path according to the above-mentioned identification information about the path. In other words, in response to the path computation request sent by the first sub-PCE, the compressed identification information about the path is returned to the first sub-PCE, and the first sub-PCE may continue to perform subsequent operations after acquiring the compressed identification information about the path. For example, the first sub-PCE may send the acquired compressed identification information about the path to the corresponding PCC, and the PCC encapsulates a packet according to the identification information about the path, and forwards the packet.

Figure 8:
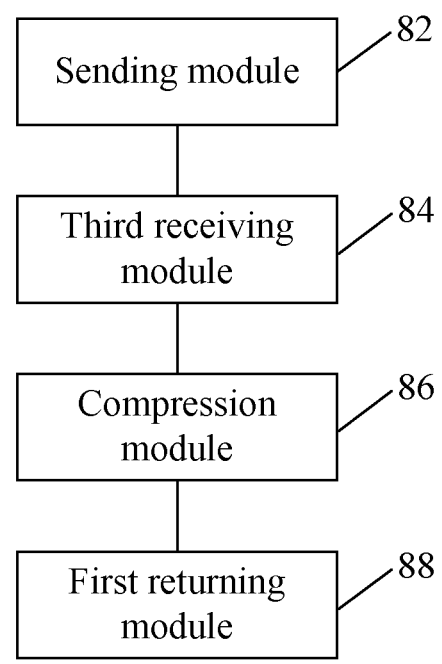
FIG. 8 is a structure diagram of a second apparatus for determining identification information about a cross-domain path according to an embodiment of the present application.

FIG. 8 is a structure diagram of a second apparatus for determining identification information about a cross-domain path according to an embodiment of the present application. As shown in FIG. 8, the apparatus includes a sending module 82, a third receiving module 84, a compression module 86 and a first returning module 88. The apparatus is described below.

The sending module 82 is configured to send a path computation request to a parent path computation element (PCE), where the path computation request is used for making a request to acquire a path from the source node to the destination node, the source node and the destination node are located in different domains, the path includes one or more path segments, and the path computation request carries the compression identifier for identifying compression of the one or more path segments and the path setup type (PST). The third receiving module 84 is connected to the sending module 82 and configured to receive a creation message from the parent PCE, where the creation message is sent by the parent PCE according to the compression identifier and the PST. The compression module 86 is connected to the third receiving module 84 and configured to compress identification information about a path segment according to the above-mentioned creation message. The first returning module 88 is connected to the compression module 86 and configured to return the compressed identification information about the one or more path segments to the parent PCE.

In an optional embodiment, the compression module 86 includes: a determination element, which is configured to determine path information about the one or more path segments carried in the above-mentioned creation message; and a creation element, which is configured to create a tunnel according to the path information, and assign a binding segment-identification (Binding SID) to the created tunnel.

In an optional embodiment, the above-mentioned creation message is used for making a request to create at least one of following tunnel: the Resource Reservation Protocol-Traffic Engineering (RSVP-TE) tunnel; or the Segment Routing-Traffic Engineering (ST-TE) tunnel. It is to be noted that the embodiment about the RSVP-TE tunnel and the embodiment about the SR-TE tunnel are merely two preferred embodiments, and other types of tunnels may be created according to actual conditions and technological developments, and are not limited herein.

In an optional embodiment, the above-mentioned creation element is configured to instantiate the tunnel according to the path information and forward the creation message to a path computation client (PCC) as a starting node of the tunnel to be created. The creation message is used for instructing the PCC to initiate, according to the path information, a process of creating the tunnel. In the embodiment, the tunnel is created by the PCC.

In an optional embodiment, when the types of tunnels to be created are different, specific operations the PCC is instructed to perform are also different. Optionally, when the above-mentioned creation message is used for making a request to create the RSVP-TE tunnel, the creation message is used for instructing the PCC to initiate an RSVP-TE signaling setup path; and optionally, when the creation message is used for making a request to create the SR-TE tunnel, the creation message is used for instructing the PCC to compute forwarding information about the path according to segment routing information.

In an optional embodiment, how to assign the Binding SID to the created tunnel is described as follows: in condition that a segment-identification (SID) is assigned by a controller globally and uniformly, after the tunnel is instantiated according to the path information, the Binding SID is assigned to the tunnel and reported to the parent PCE and the above-mentioned PCC; and/or in condition that the SID is assigned by a forwarding device and where the assigned SID is reported to the controller, the creation element receives the Binding SID assigned by the PCC to the tunnel after the tunnel is created, and reports the Binding SID to the parent PCE.

In an optional embodiment, the above-mentioned apparatus further includes: a fourth receiving module, a second returning module and a third returning module. The fourth receiving module is connected to the first returning module 88 and configured to receive compression identification information about the path from the parent PCE after the compressed identification information about the one or more path segments is returned to the parent PCE. The second returning module is connected to the fourth receiving module and configured to return the compressed identification information about the path to a predetermined path computation client (PCC), in condition that the path computation request is initiated by a predetermined PCC. The third returning module is connected to the second returning module and configured to send the compressed identification information about the path to a PCC as a starting node of the tunnel, in condition that the path computation request is not initiated by the predetermined PCC.

It is to be noted that the various modules described above may be implemented by software or hardware. Implementation by hardware may, but may not necessarily, be performed in the following manners: the various modules described above are located in the same processor, or the various modules described above are located in their respective processors in any combination form.

An embodiment of the present application further provides a storage medium. The storage medium includes stored programs which, when run, execute the method according to any embodiment described above.

Optionally, in the embodiment, the storage medium described above may include, but is not limited to, a USB flash disk, a Read-Only Memory (ROM), a Random Access Memory (RAM), a mobile hard disk, a magnetic disk, an optical disk or various other media capable of storing program codes.

The embodiment of the present application further provides a processor. The processor is configured to run programs which, when run, perform the steps of any above-mentioned method.

Apparently, it should be understood by those skilled in the art that each of the above-mentioned modules or steps of the present application may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

The above are only preferred embodiments of the present application and are not intended to limit the present application, and for those skilled in the art, the present application may have various modifications and variations. Any modifications, equivalent substitutions, improvements and the like made within the principle of the present application should fall within the scope of the present application.

What is claimed is:

1. A method for determining identification information about a cross-domain path, comprising:

receiving a path computation request from a first child path computation element (PCE), wherein the path computation request is used for making a request to acquire a path from a source node to a destination node, wherein the source node and the destination node are located in different domains, wherein the path comprises one or more path segments, and the path computation request carries a compression identifier for identifying compression of the one or more path segments and a path setup type (PST);

after identification information about the path from the source node to the destination node is acquired, instructing, according to the compression identifier and the PST, each of sub-PCEs corresponding to the one or more path segments to compress identification information about a respective one of the one or more path segments; and receiving the compressed identification information about the respective one of the one or more path segments returned by each of the sub-PCEs corresponding to the one or more path segments, and combining, according to the identification information about the path, the compressed identification information about the one or more path segments into compressed identification information about the path;

wherein the PST comprises path setup using Resource Reservation Protocol-Traffic Engineering (RSVP-TE) signaling and path setup using a segment routing technique, the compressed identification information about the path comprises a segment-identification (SID) list, the SID list comprises Binding SIDs.

2. The method of claim 1, wherein the instructing, according to the compression identifier, each of the sub-PCEs corresponding to the one or more path segments to compress the identification information about the respective one of the one or more path segments comprises:

sending, according to the compression identifier, a creation message to each of the sub-PCEs corresponding to the one or more path segments, wherein the creation message is used for requesting each of the sub-PCEs corresponding to the one or more path segments to create a tunnel and assign a Binding SID to the created tunnel, wherein the creation message carries path information about the one or more path segments.

3. The method of claim 2, wherein the creation message being used for requesting each of the sub-PCEs corresponding to the one or more path segments to create the tunnel comprises one of the following:
the creation message is used for requesting each of the sub-PCEs corresponding to the one or more path segments to create a RSVP-TE tunnel;
the creation message is used for requesting each of the sub-PCEs corresponding to the one or more path segments to create a Segment Routing-Traffic Engineering (SR-TE) tunnel; or
the creation message is used for requesting each of the sub-PCEs corresponding to the one or more path segments to create the RSVP-TE tunnel or the SR-TE tunnel.

4. The method of claim 2, wherein receiving the compressed identification information about the one or more path segments returned by each of the sub-PCEs corresponding to the one or more path segments, and combining the compressed identification information about the one or more path segments into the compressed identification information about the path comprises:
receiving the Binding SID assigned to the created tunnel and returned by each of the sub-PCEs corresponding to the one or more path segments; and
combining received Binding SIDs returned by the sub-PCEs corresponding to the one or more path segments into the compressed identification information about the path.

5. The method of claim 2, wherein the path information comprises following contents:
a path name of the path, segment information about the one or more path segments, starting node information and destination node information about the tunnel to be created, and the PST.

6. The method of claim 1, wherein after the combining, according to the identification information about the path, the compressed identification information about the one or more path segments into the compressed identification information about the path, the method comprises:
returning the compressed identification information about the path to the first sub-PCE.

7. A method for determining identification information about a cross-domain path, comprising:
sending a path computation request to a parent path computation element (PCE), wherein the path computation request is used for making a request to acquire a path from a source node to a destination node, wherein the source node and the destination node are located in different domains, wherein the path comprises one or more path segments, and the path computation request carries a compression identifier for identifying compression of the one or more path segments and a path setup type (PST);
receiving a creation message from the parent PCE, wherein the creation message is sent by the parent PCE according to the compression identifier and the PST;
compressing, according to the creation message, identification information about the one or more path segments; and
returning the compressed identification information about the one or more path segments to the parent PCE;

wherein the PST comprises path setup using Resource Reservation Protocol-Traffic Engineering (RSVP-TE) signaling and path setup using a segment routing technique, compressed identification information about the path formed by combining the compressed identification information about the one or more path segments comprises a segment-identification (SID) list, the SID list comprises Binding SIDs.

8. The method of claim 7, wherein the compressing, according to the creation message, the identification information about the one or more path segments comprises:
determining path information about the one or more path segments carried in the creation message; and
creating a tunnel according to the path information and assigning a Binding SID to the created tunnel.

9. The method of claim 8, wherein the creation message is used for making a request to create at least one of following tunnels:
a RSVP-TE tunnel, or a Segment Routing-Traffic Engineering (SR-TE) tunnel.

10. The method of claim 9, wherein the creating the tunnel according to the path information comprises:
instantiating the tunnel according to the path information, and forwarding the creation message to a path computation client (PCC) as a starting node of the tunnel to be created, wherein the creation message is used for instructing the PCC to initiate a process of creating the tunnel according to the path information.

11. The method of claim 10, comprising one of the following:
when the creation message is used for making a request to create the RSVP-TE tunnel, the creation message is used for instructing the PCC to initiate an RSVP-TE signaling setup path; or
when the creation message is used for making a request to create the SR-TE tunnel, the creation message is used for instructing the PCC to compute forwarding information about the path according to segment routing information.

12. The method of claim 10, wherein assigning the Binding SID to the created tunnel comprises:
in condition that the SID is assigned by a controller globally and uniformly, assigning the Binding SID to the tunnel and reporting the Binding SID to the parent PCE and the PCC after the tunnel is instantiated according to the path information; and/or
in condition that the SID is assigned by a forwarding device and the assigned SID is reported to the controller, receiving the Binding SID assigned by the PCC to the tunnel after the PCC creates the tunnel, and reporting the Binding SID to the parent PCE.

13. The method of claim 8, wherein after the returning the compressed identification information about the one or more path segments to the parent PCE, the method further comprises:
receiving compressed identification information about the path from the parent PCE;
in condition that the path computation request is initiated by a predetermined path computation client (PCC), returning the compressed identification information about the path to the predetermined PCC; and
in condition that the path computation request is not initiated by the predetermined PCC, sending the compressed identification information about the path to a PCC as a starting node of the tunnel.

14. An apparatus for determining identification information about a cross-domain path, comprising:

at least one processor; and a memory for storing instructions executable by the at least one processor, wherein the at least one processor is configured to perform:
receiving a path computation request from a first child path computation element (PCE), wherein the path computation request is used for making a request to acquire a path from a source node to a destination node, wherein the source node and the destination node are located in different domains, wherein the path comprises one or more path segments, and the path computation request carries a compression identifier for identifying compression of the one or more path segments and a path setup type (PST);
after identification information about the path from the source node to the destination node is acquired, instructing, according to the compression identifier and the PST, each of sub-PCEs corresponding to the one or more path segments to compress identification information about a respective one of the one or more path segments; and
receiving the compressed identification information about the respective one of the one or more path segments returned by each of the sub-PCEs corresponding to the one or more path segments, and combining, according to the identification information about the path, the compressed identification information about the one or more path segments into compressed identification information about the path;
wherein the PST comprises path setup using Resource Reservation Protocol-Traffic Engineering (RSVP-TE) signaling and path setup using a segment routing technique, the compressed identification information about the path comprises a segment-identification (SID) list, the SID list comprises Binding SIDs.

15. The apparatus of claim 14, wherein the instructing, according to the compression identifier, each of the sub-PCEs corresponding to the one or more path segments to compress the identification information about the respective one of the one or more path segments comprises:
sending, according to the compression identifier, a creation message to each of the sub-PCEs corresponding to the one or more path segments, wherein the creation message is used for requesting each of the sub-PCEs corresponding to the one or more path segments to create a tunnel and assign a Binding SID to the created tunnel, wherein the creation message carries path information about the one or more path segments.

16. The apparatus of claim 15, wherein the creation message being used for requesting each of the sub-PCEs corresponding to the one or more path segments to create the tunnel comprises one of the following:
the creation message is used for requesting each of the sub-PCEs corresponding to the one or more path segments to create a RSVP-TE tunnel;
the creation message is used for requesting each of the sub-PCEs corresponding to the one or more path segments to create a Segment Routing-Traffic Engineering (SR-TE) tunnel; or
the creation message is used for requesting each of the sub-PCEs corresponding to the one or more path segments to create the RSVP-TE tunnel or the SR-TE tunnel.

17. The apparatus of claim 15, wherein the receiving the compressed identification information about the one or more path segments returned by the each of the sub-PCEs corresponding to the one or more path segments, and combining the compressed identification information about the one or more path segments into the compressed identification information about the path comprises:
receiving the Binding SID assigned to the created tunnel and returned by each of the sub-PCEs corresponding to the one or more path segments; and
combining received Binding SIDs returned by the sub-PCEs corresponding to the one or more path segments into the compressed identification information about the path.

18. The apparatus of claim 15, wherein the path information comprises following contents:
a path name of the path, segment information about the one or more path segments, starting node information and destination node information about the tunnel to be created, and the PST.

19. The apparatus of the claim 14, wherein after the combining, according to the identification information about the path, the compressed identification information about the one or more path segments into the compressed identification information about the path, further comprising:
returning the compressed identification information about the path to the first sub-PCE.

20. A non-transitory storage medium, comprising stored programs which, when executed, execute the method of any one of claims 1 to 13.

* * * * *